United States Patent
Ni et al.

(10) Patent No.: US 12,314,266 B2
(45) Date of Patent: May 27, 2025

(54) METHOD, DEVICE, AND PRODUCT FOR SEARCHING DATA

(71) Applicant: Dell Products L.P., Round Rock, TX (US)

(72) Inventors: Jiacheng Ni, Shanghai (CN); Bin He, Shanghai (CN); Tianxiang Chen, Shanghai (CN); Zhen Jia, Shanghai (CN); Zijia Wang, Weifang (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/486,616

(22) Filed: Oct. 13, 2023

(65) Prior Publication Data
US 2025/0103599 A1    Mar. 27, 2025

(30) Foreign Application Priority Data
Sep. 22, 2023   (CN) .......................... 202311238046.2

(51) Int. Cl.
G06F 16/00     (2019.01)
G06F 16/2457   (2019.01)
G06F 16/2458   (2019.01)

(52) U.S. Cl.
CPC ...... *G06F 16/2457* (2019.01); *G06F 16/2462* (2019.01)

(58) Field of Classification Search
CPC .......................... G06F 16/2457; G06F 16/2462
See application file for complete search history.

(56) References Cited

U.S. PATENT DOCUMENTS 11,651,037 B2 * 5/2023 Shi .................... G06F 16/90348
                                                           707/705
11,825,014 B1 * 11/2023 Thurau ................ G06F 3/0482
(Continued)

FOREIGN PATENT DOCUMENTS

CN         116824246 A  *  9/2023

OTHER PUBLICATIONS

Wang et al.,"Effective deep learning-based multi-modal retrieval",2016,the VLDB Journal,pp. 79-101 (Year: 2016).*
(Continued)

*Primary Examiner* — Alexander Khong
(74) *Attorney, Agent, or Firm* — Ryan, Mason & Lewis, LLP

(57) ABSTRACT

The present disclosure relates to a method, a device, and a product for searching data. The method includes: encoding a search input into a first dense vector based on a first multi-modal search model; determining, based on the first dense vector, a distilled data item corresponding to the search input from a distilled dataset corresponding to the first multi-modal search model; encoding, based on the first multi-modal search model, an original data item in an original data subset corresponding to the distilled data item in an original dataset corresponding to the distilled dataset into a second dense vector; and determining, based on the second dense vector, an original data item from the original data subset as a search result corresponding to the search input. The method for searching data according to the present disclosure can improve the efficiency and security of data storage, model reproduction, and multi-modal data management.

20 Claims, 5 Drawing Sheets

(56) References Cited

U.S. PATENT DOCUMENTS

| | | | | |
|---|---|---|---|---|
| 2004/0199874 A1* | 10/2004 | Larson | ................. | G06F 40/103 |
| | | | | 715/249 |
| 2019/0370616 A1* | 12/2019 | Eser | ...................... | G06F 18/256 |
| 2023/0394387 A1* | 12/2023 | Jia | .................... | G06Q 10/06311 |
| 2024/0152561 A1* | 5/2024 | Mallapragada | ..... | G06F 16/9038 |

OTHER PUBLICATIONS

Jina AI Limited, "Welcome to Jina!" https://docs.jina.ai/, Apr. 18, 2023, 6 pages.
T. Wang et al., "Dataset Distillation," arXiv:1811.10959v3, Feb. 24, 2020, 14 pages.
Open AI, "Clip: Connecting Text and Images," https://openai.com/research/clip, Jan. 5, 2021, 17 pages.
A. Radford et al., "Learning Transferable Visual Models From Natural Language Supervision," International Conference on Machine Learning, arXiv:2103.00020v1, Feb. 26, 2021, 48 pages.
S. Li, "Named Entity Recognition with NLTK and SpaCy," https://towardsdatascience.com/named-entity-recognition-with-nltk-and-spacy-8c4a7d88e7da, Aug. 17, 2018, 18 pages.

* cited by examiner

METHOD, DEVICE, AND PRODUCT FOR SEARCHING DATA

RELATED APPLICATION

The present application claims priority to Chinese Patent Application No. 202311238046.2, filed Sep. 22, 2023, and entitled "Method, Device, and Product for Searching Data," which is incorporated by reference herein in its entirety.

FIELD

Various embodiments described herein relate to the field of data search, and more particularly, to a method, a device, and a computer program product for searching data.

BACKGROUND

The Artificial Intelligence and Big Data industries rely on massive amounts of data and computing power. Management of data, an Artificial Intelligence/Machine Learning (AI/ML) model, and an underlying Information Technology (IT) system are very complex and costly. A Hyper Converged Infrastructure (HCI) system facilitates alleviating complexity issues, but traditional technologies such as deduplication ("dedup") do not help significantly in reducing storage costs.

With the increasing amount of unstructured data, there is an increasing need for multi-modal based data management. For example, such an arrangement is expected to search for an image through a text. However, training and maintaining a multi-modal deep learning neural network also results in high costs.

SUMMARY

Embodiments of the present disclosure provide a method, a device, and a computer program product for searching data.

According to one aspect of the present disclosure, a method for searching data is provided, including: encoding a search input into a first dense vector based on a first multi-modal search model; determining, based on the first dense vector, a distilled data item corresponding to the search input from a distilled dataset corresponding to the first multi-modal search model; encoding, based on the first multi-modal search model, an original data item in an original data subset corresponding to the distilled data item in an original dataset corresponding to the distilled dataset into a second dense vector; and determining, based on the second dense vector, an original data item from the original data subset as a search result corresponding to the search input.

According to another aspect of the present disclosure, an electronic device is provided, including: a processing unit; and a memory coupled to the processing unit and storing instructions, wherein the instructions, when executed by the processing unit, cause the electronic device to perform the following actions: encoding a search input into a first dense vector based on a first multi-modal search model; determining, based on the first dense vector, a distilled data item corresponding to the search input from a distilled dataset corresponding to the first multi-modal search model; encoding, based on the first multi-modal search model, an original data item in an original data subset corresponding to the distilled data item in an original dataset corresponding to the distilled dataset into a second dense vector; and determining, based on the second dense vector, an original data item from the original data subset as a search result corresponding to the search input.

According to still another aspect of the present disclosure, a computer program product is provided, the computer program product being tangibly stored on a non-transitory computer-readable medium and including computer-executable instructions, and the computer-executable instructions, when executed by a computer, causing the computer to perform the following operations: encoding a search input into a first dense vector based on a first multi-modal search model; determining, based on the first dense vector, a distilled data item corresponding to the search input from a distilled dataset corresponding to the first multi-modal search model; encoding, based on the first multi-modal search model, an original data item in an original data subset corresponding to the distilled data item in an original dataset corresponding to the distilled dataset into a second dense vector; and determining, based on the second dense vector, an original data item from the original data subset as a search result corresponding to the search input.

This Summary is provided to introduce relevant concepts in a simplified manner, and these concepts will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
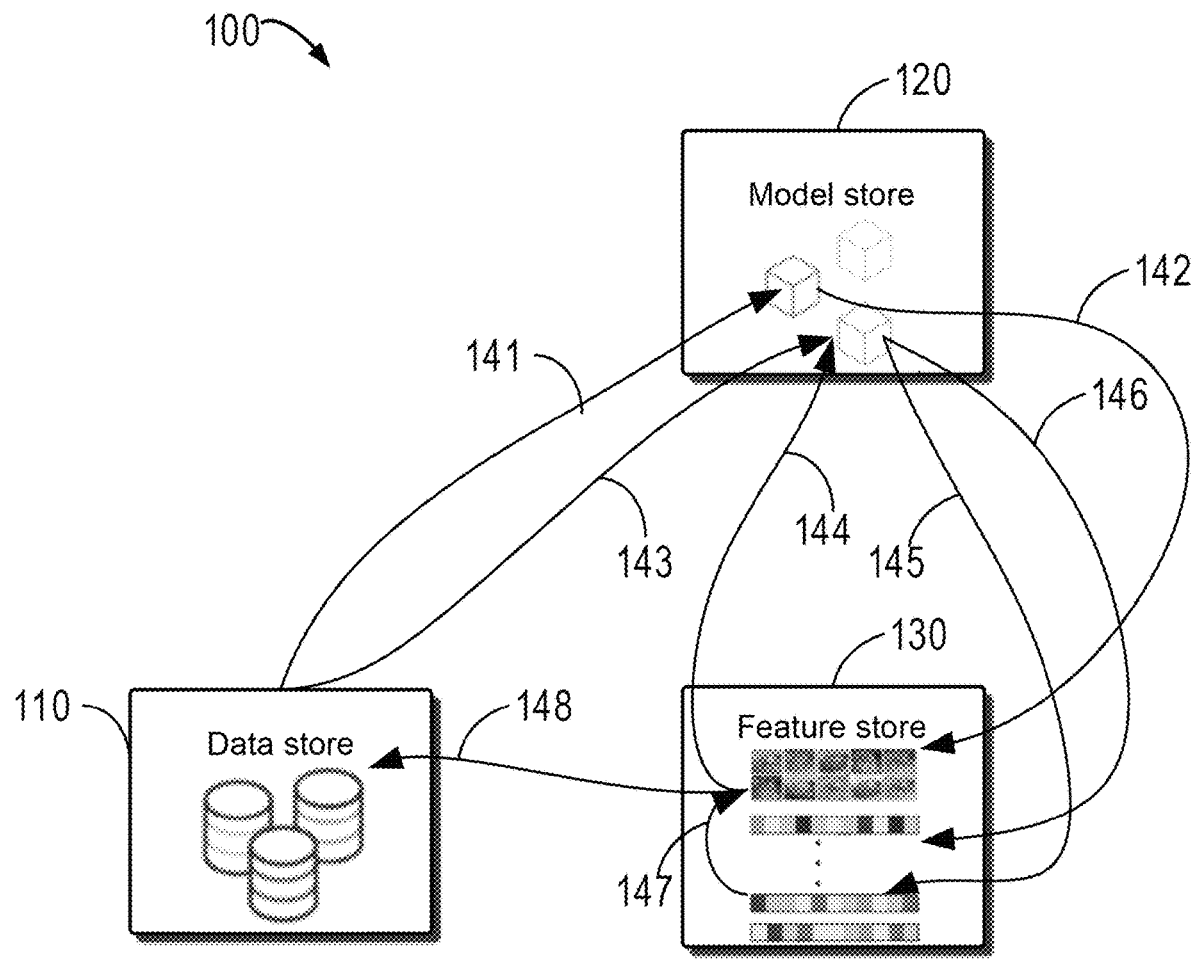
FIG. 1 shows a schematic diagram of a storage device according to an embodiment of the present disclosure.

Illustrative embodiments of the present disclosure will be described in more detail below with reference to the accompanying drawings. Although some specific embodiments of the present disclosure are shown in the accompanying drawings, it should be understood that the present disclosure may be implemented in various forms, and should not be construed as being limited to the embodiments set forth herein. Rather, these embodiments are provided to make the present disclosure more thorough and complete and can fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless it is clearly stated that the terms refer to different objects.

The following embodiments are examples. Although the specification may mention "an," "one," or "some" embodiment(s) in some places, this does not necessarily mean that every such mention refers to the same embodiment, or that the feature only applies to a single embodiment. Individual features of different embodiments may also be combined to provide other embodiments. In addition, the words "include" and "contain" should be understood as not limiting the embodiments to only consisting of those already mentioned features, and such embodiments may also include features/structures that have not been specifically mentioned.

In the field of data search, the term "modal" is an abbreviation for "data modality." The data modality may be considered as the type of data. "Multi-modal" refers to the ability of a system of using a plurality of modalities or input channels to achieve expected goals. For example, a human can use both visual and auditory senses to recognize other persons or objects. Cross-modality refers to the ability of a system of using information from one modality to improve the performance of another modality. For example, if a photo of a dog is seen, a dog can be recognized based on its bark when the bark is heard. An AI system designed for a plurality of modalities is called a "multi-modal" AI system. However, when referring to an AI system that uses information from one modality to improve the performance of another modality, the term "cross-modality" is more accurate.

Dataset distillation (sometimes also referred to as "data distillation") is a process of creating a small number of synthetic samples from an original dataset, and these samples can quickly train a network to achieve (approximately) the same accuracy as when training on the original dataset. Here, the "small number" refers to that compared with the amount of data in the original dataset, the amount of data in the dataset obtained after distillation (sometimes also referred to as "distilled dataset" or "distilled data" below) is less, for example, equivalent to a value in the range of about 1% to 10% (e.g., 5%) of the amount of data of the original dataset, which may be measured by, for example, the number of data items, the size of storage space occupied, and the like. Specifically, for example, in one embodiment, there are 5 million data records (that is, data items) in the original dataset, and there are 300,000 data records in the distilled dataset, that is, the number of data items in the distilled dataset is 6% of that of the original dataset. In another embodiment, the storage space occupied by the original dataset is 100 MB, while the storage space occupied by the distilled dataset is 5 MB, that is, the occupied storage space of the is equivalent to 5% of that of the original dataset.

Evidence has shown that for a model known to have been initialized, training the model on a small number of synthetic images from a distribution completely different from the training data can achieve the original accuracy. In other words, when processing a task, the multi-modal model trained by using a distilled dataset (hereinafter also referred to as a "first multi-modal search model") can reach the accuracy of processing the task by the multi-modal model trained by using the original dataset (hereinafter also referred to as a "second multi-modal search model"). For example, after an LeNet (a traditional convolutional neural network) is trained on only 10 synthetic images, an accuracy of 94% can be achieved on a Modified National Institute of Standards and Technology (MNIST) task (a handwritten digit recognition task). In view of this, a distilled dataset (where each data item obtained by distillation is an example of the aforementioned "synthetic image") may be used to train a multi-modal model, and then the trained multi-modal model may be used to complete the recognition task.

Contrastive Language-Image Pre-Training (CLIP) is a neural network that can effectively learn visual concepts from natural language supervision. The CLIP pre-trains an image encoder and a text encoder to predict which images match which texts in the dataset. The method uses a large number of available sources of supervision, such as a large amount of texts found on the Internet that match images. These pieces of data are used for creating the following proxy training task for the CLIP: Given an image, predicting which text segment among a set of 32,768 randomly sampled text segments in the dataset actually matches it.

In the present disclosure, the technical problem to be solved is how to improve the efficiency of data storage, model reproduction, and multi-modal data management. From a technical perspective, it is necessary to solve technical problems such as how to improve the model reproduction efficiency and how to build an efficient multi-modal neural search engine for multi-modal data management. In other words, it is necessary to solve the problem of using a small dataset (such as the distilled dataset) to obtain the first multi-modal search model, and the first multi-modal search model can reproduce the second multi-modal search model obtained by using the original dataset. Here, the meaning of "reproduce" refers to, for example, that the second multi-modal search model trained by using the original dataset can achieve an accuracy of 100% on the MNIST, as mentioned above. The first multi-modal search model trained by using a subset of the original dataset or the distilled dataset can achieve an accuracy of 94% on the MNIST. In some embodiments, when the accuracy of the first multi-modal search model can reach over 90% of that of the second multi-modal search model, it may be considered that the first multi-modal search model can "reproduce" the second multi-modal search model. As can be seen, distilled data can reproduce a deep learning model with a small accuracy loss.

Therefore, according to the present disclosure, a hierarchical storage strategy is provided, in which the data after distillation (that is, the distilled dataset) is stored as an index to the original dataset. The present disclosure further provides an integrated solution for AI and data management, in which the data after distillation may be used to reproduce an AI/ML model, and information after distillation (for example, the data after distillation (that is, the distilled dataset) or information obtained based on the data after distillation (for example, the dense vector)) may be stored as an index or data backup in an expensive feature store (see a feature store 130 in FIG. 1). A multi-modal deep learning neural network is constructed on these pieces of data after distillation (as an index to the original data) to reproduce the AI/ML model constructed on the original data, thereby providing multi-modal search features. Specifically, in some embodiments, a method for searching data is provided, including: encoding a search input into a first dense vector based on a first multi-modal search model; determining, based on the first dense vector, a distilled data item corresponding to the search input from a distilled dataset corresponding to the first multi-modal search model; encoding, based on the first multi-modal search model, an original data item in an original data subset corresponding to the distilled data item in an original dataset corresponding to the distilled dataset into a second dense vector; and determining, based on the second dense vector, an original data item from the original data subset as a search result corresponding to the search input.

Through such technical ideas and methods, the present disclosure provides a pipeline processing method that can coordinate AI/ML model training, training data distillation, and multi-modal data management, thereby improving the efficiency and security of data storage, model reproduction, and multi-modal data management.

Basic principles and several example embodiments of the present disclosure are described below with reference to FIG. 1 to FIG. 5. It should be understood that these example embodiments are given only to enable those skilled in the art to better understand and thus implement embodiments of the present disclosure, and are not intended to limit the scope of the present disclosure in any way.

FIG. 1 shows a schematic diagram of a storage device 100 according to an embodiment of the present disclosure. As shown in FIG. 1, the storage device 100 includes a data store 110, a model store 120, and a feature store 130. The data store 110 stores an original dataset (such as an original dataset 310 shown in FIG. 3A, which will be introduced later). The model store 120 stores various models, including but not limited to, for example, a data distillation model for performing data distillation and a multi-modal search model for searching data (such as the first multi-modal search model mentioned earlier). The feature store 130 stores a distilled dataset (such as a distilled dataset 330 shown in FIG. 3A, which will be introduced later) and its feature information (such as dense vectors corresponding to various data items in the distilled dataset).

The storage device 100 in FIG. 1 may be considered as a storage device system obtained by extending the traditional data store 110 by the model store 120 and the feature store 130. In the model store 120, a feature encoder encodes distilled data and user search data (such as a search input that is input by a user, which may be a text or an image) into dense vectors. In the feature store 130, the dense vectors of the distilled data are indexed as semantic metadata. Then, the data storage product (that is, the data store 110) is extended by the model store 120 and the feature store 130.

When a user needs to search for data items that meet a specific search condition from the data store 110, a search input is first encoded as a dense vector by using a text encoder (such as a text encoder 420 shown in FIG. 4A) or an image encoder (such as an image encoder 440 shown in FIG. 4A) in the model store 120, and then the nearest neighbors search is used to find the most similar distilled data item from the distilled dataset. The distilled data item is obtained by training a specific dataset in the original dataset in the data store 110, and the specific dataset corresponding to the distilled data item is a subset of the original dataset (hereinafter also referred to as the "original data subset" in brief). Therefore, based on the distilled data item, the nearest neighbors search is used to further find the most similar original data item from the data store 110, and the original data item is returned to the user as a search result.

Specifically, as shown by curves 141 and 142 in FIG. 1, the data in the original dataset in the data store 110 is distilled by a certain data distillation model in the model store 120 to obtain a distilled dataset, which is stored in the feature store 130. As shown by curves 143, 144, 145, and 146 in FIG. 1, some data items in the original dataset in the data store 110 and some data items in the distilled dataset in the feature store 130 are associated with a certain model in the model store 120. As shown by a curve 147 in FIG. 1, when a user enters a search input, the search input is encoded into a dense vector (also referred to as a "first dense vector" hereinafter) using a text encoder or an image encoder in the model store 120, the dense vector is compared with various dense vectors obtained by encoding the distilled data items in the distilled dataset, and the nearest neighbors search is used to find the distilled data item that is most similar to the search input from the distilled dataset. That is, differences between the first dense vector and various dense vectors among the plurality of dense vectors (that is, distances between various dense vectors among the plurality of dense vectors and the first dense vector) are calculated respectively, the various difference values are compared respectively to find the minimum difference, then based on the minimum difference, a dense vector corresponding to the minimum difference is found from the plurality of dense vectors, and the corresponding distilled data item in the distilled dataset is found based on the dense vector. Furthermore, as shown in a curve 148 in FIG. 1, based on the distilled data item, various original data items corresponding to the distilled data item in the original dataset are encoded into a plurality of dense vectors (also referred to as "second dense vectors" hereinafter), and the first dense vector is compared with the second dense vectors, that is, differences between the first dense vector and the various second dense vectors are calculated. Here, the "various original data items corresponding to the distilled data item in the original dataset" refer to the "specific dataset in the original dataset" mentioned above. Then, the obtained various difference values are compared to find the minimum difference, and based on the minimum difference, a second dense vector corresponding to the minimum difference is found from the plurality of second dense vectors. Based on the second dense vector, an original data item corresponding to the found second dense vector is found from the various original data item corresponding to the distilled data item in the original dataset, and the original data item is returned to the user as the final search result.

It should be understood that FIG. 1 only shows some elements and functional entities, all of which are logical units, and their implementations may be different from those shown. For those skilled in the art, it is evident that the storage device 100 typically includes other functions and structures beyond those shown in FIG. 1. That is, FIG. 1 schematically shows the storage device 100 as at least a part of a storage device system (such as a storage product). The embodiments are not limited to the storage device 100 provided as an example, but the solution may be applied by those skilled in the art to other storage devices with appropriate characteristics.

Figure 2:
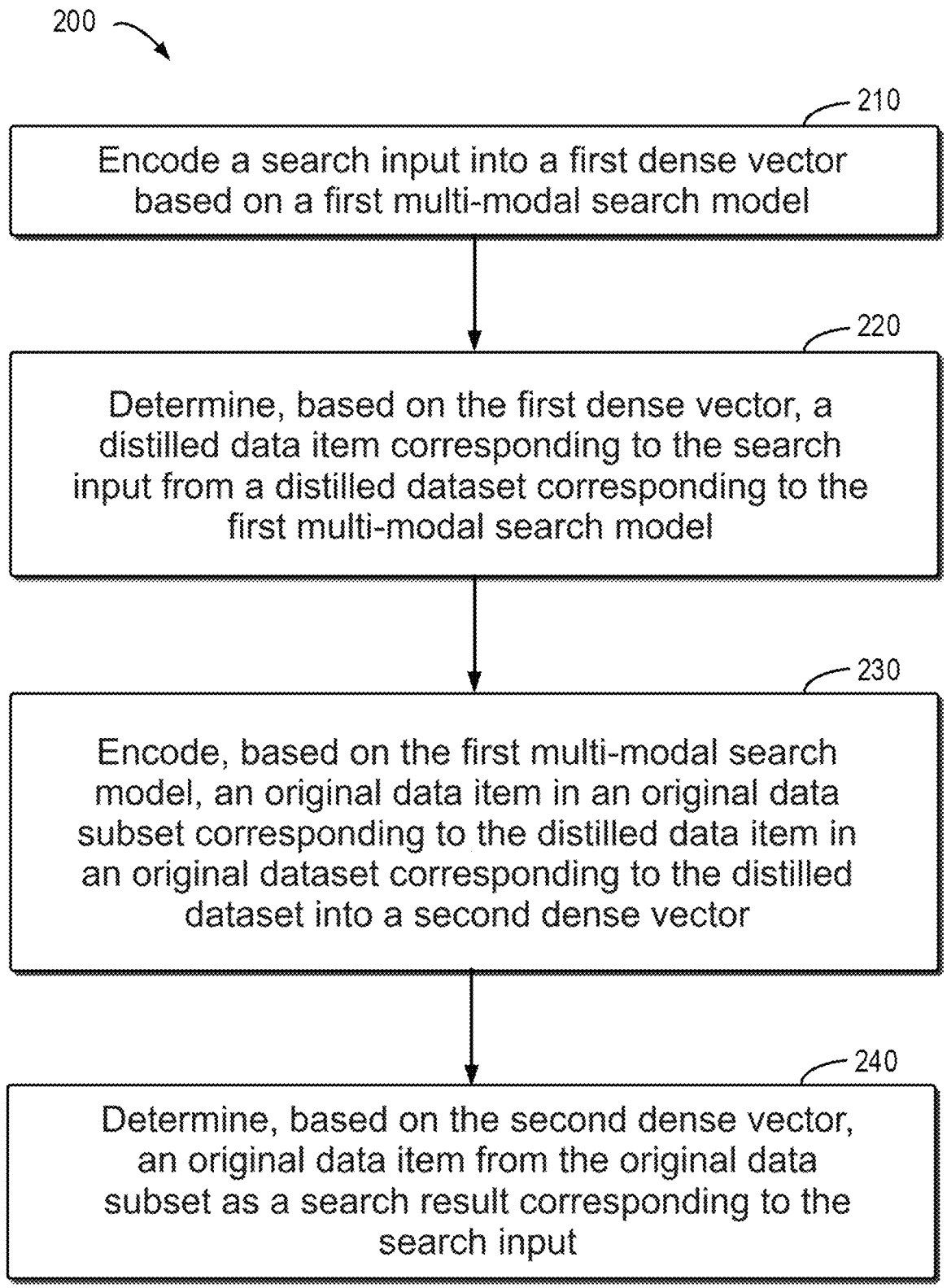
FIG. 2 shows a flow chart of a method for searching data according to an embodiment of the present disclosure.

FIG. 2 shows a flow chart of a method 200 for searching data according to an embodiment of the present disclosure. The example method 200 will be described with reference to FIG. 1.

Figure 3A:
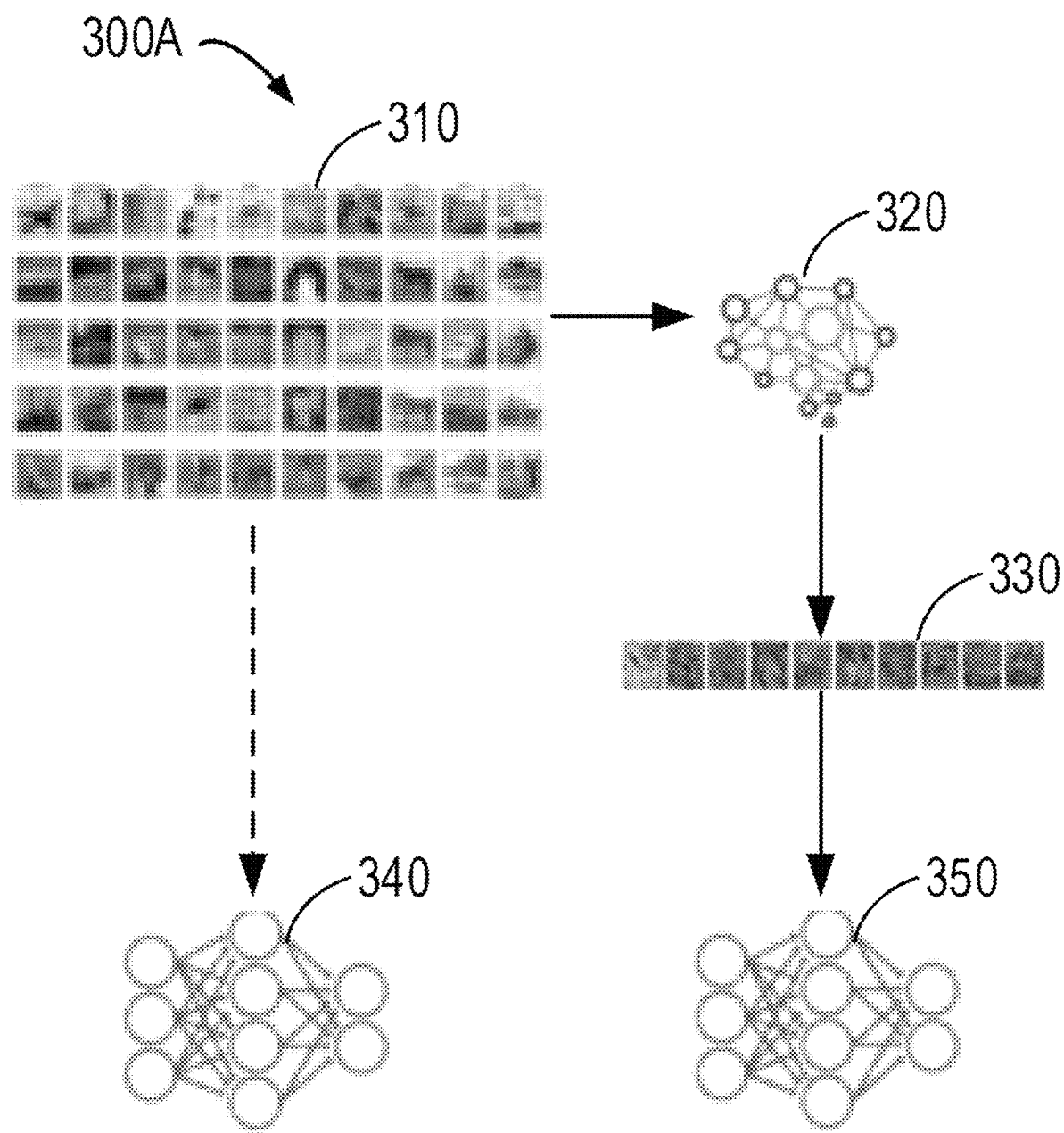
FIG. 3A shows a schematic diagram of a method for constructing a multi-modal neural search model according to an embodiment of the present disclosure.

As shown in FIG. 2, in the example method 200, at 210, a search input is encoded into a first dense vector based on a first multi-modal search model (such as a multi-modal search model 350 in FIG. 3A). For example, referring to FIG. 3A, the search input is encoded into the first dense vector based on the multi-modal search model 350. The multi-modal search model 350 is also referred to herein as a first multi-modal search model.

At 220, a distilled data item corresponding to the search input is determined from a distilled dataset (such as the distilled dataset 330 in FIG. 3A) corresponding to the first multi-modal search model based on the first dense vector. For example, referring to FIG. 3A, the distilled data item corresponding to the search input is determined from the distilled dataset 330 based on the first dense vector.

At 230, various original data items in an original data subset corresponding to the distilled data item determined at 220 in the original dataset (such as the original dataset 310 in FIG. 3A) corresponding to the distilled dataset are encoded into second dense vectors based on the first multi-modal search model. Here, the original data subset refers to a set of original data items corresponding to the distilled data item determined in 220 in the original dataset. For example, referring to FIG. 3A and FIG. 3B, various original data items in the original data subset corresponding to the distilled data item determined at 220 in the original dataset 310 are encoded into the second dense vectors respectively based on the first multi-modal search model 350.

At 240, an original data item is determined from the original data subset as a search result corresponding to the search input based on the second dense vectors. For example, distances (differences) between the first dense vector and the various second dense vectors are calculated, the second dense vector with the closest distance (the minimum difference) to the first dense vector is found, and then based on the second dense vector, the corresponding original data item is determined from the original data subset as the search result corresponding to the search input. For the specific steps of determining the original data item as the search result from the original data subset, reference may be made to the description of FIG. 1.

In order to construct a multi-modal neural search model, each class of a training dataset is saved as a folder in the data store, and each file in the folder is a training sample of the class. First, a deep learning neural network is trained on the training dataset to obtain a trained deep learning model. Then, the training dataset is distilled by using dataset distillation to obtain a limited number of distilled images (or sentences) (representing a class) for each data folder. As mentioned above, the distilled data can reproduce a deep learning model with small accuracy losses. The distilled data is further used as a representative (index) of a data folder to improve the efficiency of data management. This is illustrated below with reference to FIG. 3A and FIG. 3B.

FIG. 3A shows a schematic diagram of a method 300A of constructing a multi-modal neural search model according to an embodiment of the present disclosure. As shown in FIG. 3A, the distilled dataset 330 is obtained by distillation using a data distillation model 320 from the original dataset 310. The first multi-modal search model 350 is obtained by training using the distilled dataset 330. The first multi-modal search model 350 is a deep learning model.

Assuming that the search model (that is, the first multi-modal search model 350 shown in FIG. 3A) is obtained not by training using the distilled dataset 330, but rather obtained by training using the original dataset 310 (that is, a second multi-modal search model 340 shown in FIG. 3A). In this case, as mentioned earlier, the first multi-modal search model 350 can achieve comparable performance compared with the second multi-modal search model 340. For example, the accuracy of processing a task using the first multi-modal search model 350 can reach over 90% of that when processing the same task using the second multi-modal search model 340. Therefore, it may be considered that the first multi-modal search model 350 can "reproduce" the second multi-modal search model 340. That is, the distilled data can reproduce the deep learning model with small accuracy losses. Therefore, the first multi-modal search model 350 (rather than the second multi-modal search model 340) which is "lighter" than the second multi-modal search model 340 may be used to process the search task. In view of this, an arrowed line from the original dataset 310 to the second multi-modal search model 340 in FIG. 3A is shown as a dashed line, and an arrowed line from the distilled dataset 330 to the first multi-modal search model 350 is shown as a solid line, indicating that the lighter first multi-modal search model 350 (rather than the second multi-modal search model 340) may be directly used to process the search task in a practical application.

Figure 3B:
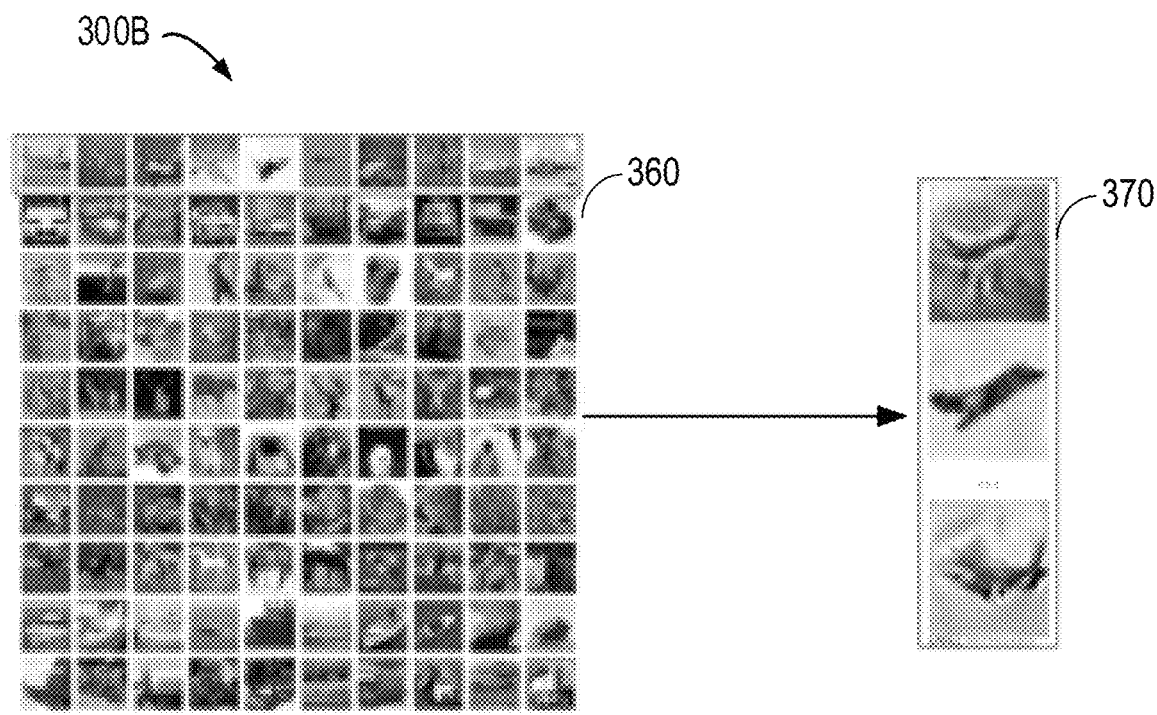
FIG. 3B shows an example of data distillation according to an embodiment of the present disclosure.

FIG. 3B shows a data distillation example 300B according to an embodiment of the present disclosure. In the data distillation example 300B, distillation is performed on an original dataset 360 to obtain a distilled dataset 370. The distilled dataset 370 in FIG. 3B and the distilled dataset 330 in FIG. 3A are both examples of the distilled dataset, and the original dataset 360 in FIG. 3B and the original dataset 310 in FIG. 3A are both examples of the original dataset. As also can be seen from FIG. 3B, the data volume of the distilled dataset 370 is much smaller than that of the original dataset 360.

In some embodiments, for example, in the original dataset 360, as described above, there is a total of 10 classes, named "airplane," "car," "bird," "cat," "deer," "dog," "frog," "horse," "ship," and "truck." Each class is saved as a folder in the data store (for example, the data store 110 shown in FIG. 1), and each file in the folder is a training sample of the class. In the embodiment shown in FIG. 3B, there are 5,000 images (that is, 5,000 image data items) in each class, resulting in a total of 50,000 images (that is, 50,000 image data items). In other words, there are 5,000 image files saved in the folder corresponding to each class, and there is a total of 10 folders corresponding to a total of 10 classes, that is, there is a total of 50,000 image files saved in the 10 folders.

A deep learning neural network is trained on the training dataset to obtain a trained deep learning model, and then the training dataset is distilled by using data distillation to obtain a limited number of distilled images (or sentences) (representing a class) for each data folder. In the embodiment shown in FIG. 3B, the data distillation is performed on the original dataset 360 (as shown by 320 in FIG. 3A) to obtain the distilled dataset 370. In the obtained distilled dataset 370, there are 50 images in each class, and a total of 500 images in 10 classes. As can be seen, the data volume of the distilled dataset 370 is 1% of that of the original dataset 360.

After the distilled dataset 370 is obtained, all distilled data (that is all distilled data items in the distilled dataset 370) are encoded, and dense vectors obtained by encoding are stored in the feature store (such as the feature store 130 shown in FIG. 1) as indexes to the original dataset 360.

In some embodiments, when the storage device 100 shown in FIG. 1 is used for data search, a multi-modal neural search model (for example, the first multi-modal search model 350 shown in FIG. 3A) is constructed in a first stage.

Figure 4A:
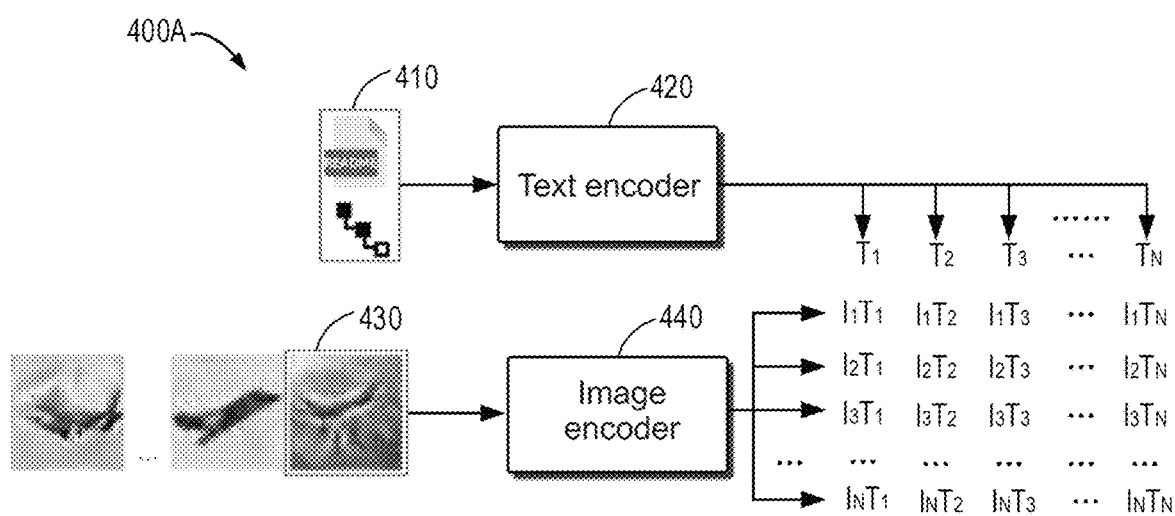
FIG. 4A shows a schematic diagram of a method for constructing a multi-modal neural search model according to an embodiment of the present disclosure.

FIG. 4A shows a schematic diagram of a method 400A for constructing a multi-modal neural search model according to an embodiment of the present disclosure. For example, for images in the original dataset, distillation is performed to obtain image data after distillation (hereinafter also referred to as "distilled image data"), and the distilled image data includes text information and image information. The text information includes, for example, machine learning task descriptions, dataset descriptions, class names, and folder paths, while the image information includes, for example, images after distillation (hereinafter also referred to as "distilled images"). When the multi-modal neural search model is constructed, the text information included in the distilled image data (that is, the machine learning task descriptions, the dataset descriptions, the class names, the folder paths, and the like) is used as a text input 410 of a CLIP model, and the distilled images are used as an image input 430 of the CLIP model to train the multi-modal neural search model. Specifically, as shown in FIG. 4A, the text input 410 is input into the text encoder 420 for encoding to obtain text information ($T_1$, $T_2$, $T_3$, . . . , and $T_N$ shown in FIG. 4A), and the image input 430 is input into the image encoder 440 for encoding to obtain image information ($I_1$, $I_2$, $I_3$, . . . , and $I_N$ shown in FIG. 4A). Then, the CLIP model is trained on pairs of distilled images and their overall descriptions ($I_1T_1$, $I_1T_2$, $I_1T_3$, . . . , $I_1T_N$, $I_2T_1$, $I_2T_2$, $I_2T_3$, . . . , $I_2T_N$, . . . , and $I_NT_N$ shown in FIG. 4A).

Figure 4B:
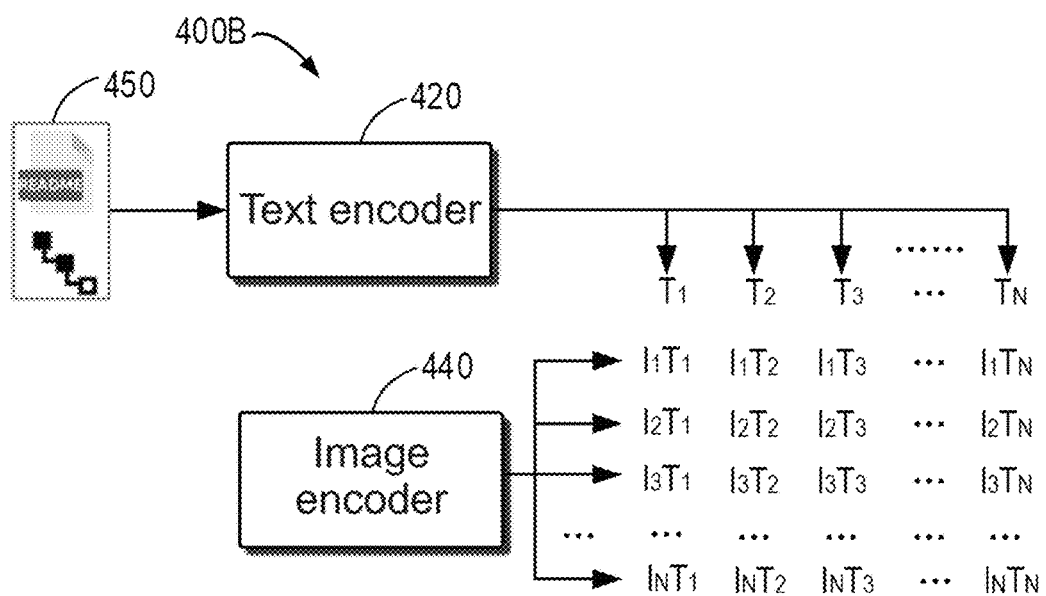
FIG. 4B shows a schematic diagram of a method for constructing a multi-modal neural search model according to an embodiment of the present disclosure.

FIG. 4B shows another schematic diagram of a method 400B for constructing a multi-modal neural search model according to an embodiment of the present disclosure. The method shown in FIG. 4B differs from the method shown in FIG. 4A in that for the text files in the original dataset, as they do not contain image information, distillation is performed to obtain distilled text files. The distilled text files only include text information and do not include image information. The text information includes, for example, machine learning task descriptions, dataset descriptions, class names, and folder paths. Therefore, when a multi-modal neural search model is constructed, the distilled text files themselves and their text information (such as the machine learning task descriptions, the dataset descriptions, the class names, and the folder paths) are used as a text input 450 of the CLIP model to train the multi-modal neural search model. Only the text encoder of the CLIP model is trained as a language model. Specifically, in FIG. 4B, only the text input 450 is input for the text encoder. A difference between the text input 450 and the text input 410 in FIG. 4A is that the text input 450 not only includes the text information (such as the machine learning task descriptions, dataset descriptions, class names, and the folder paths), but also includes the distilled text files themselves.

When the storage device 100 shown in FIG. 1 is used for data search, in a second stage, the multi-modal neural search model constructed in the first stage (such as the first multi-modal search model 350 shown in FIG. 3A) is used for multi-modal search by the user. At the second stage, the user enters a search input, and the search input may be, for example, either a search keyword (text) or a picture (image). The search input is encoded into a dense vector (the first dense vector) by using the multi-modal neural search model constructed in the first stage, and by using the nearest neighbors search, a dense vector most similar to the first dense vector (that is, the dense vector with the minimum distance to the first dense vector) is found from the plurality of dense vectors obtained by encoding the distilled data (for example, the various distilled data items in the distilled dataset 330 shown in FIG. 3A and the various distilled data items in the distilled dataset 370 shown in FIG. 3B), and then the distilled data item corresponding to the most similar dense vector is found.

Then, the multi-modal neural search model is used to encode all the original data items represented by the most similar distilled data item in the original dataset (for example, the original dataset 310 shown in FIG. 3A and the original dataset 360 shown in FIG. 3B) to obtain a plurality of dense vectors (second dense vectors), and the nearest neighbors search is used to find the dense vector most similar to the first dense vector from these second dense vectors. Furthermore, based on the most similar dense vector, the original data item corresponding to the most similar dense vector (the original data item is an original data item most similar to the search input that is input by the user) is found from the original data items represented by the most similar distilled data item, and is used as the search result corresponding to the search input that is input by the user. Here, "the original data items represented by the most similar distilled data item in the original dataset" refer to the various original data items corresponding to the distilled data item in the original dataset, also known as a "specific dataset in the original dataset" herein, and refer to various original data items in the original data subset corresponding to the distilled data item determined at 220 in FIG. 2 in the original dataset. In the data distillation process, the original data items in the original dataset are distilled to obtain the distilled data item.

Figure 5:
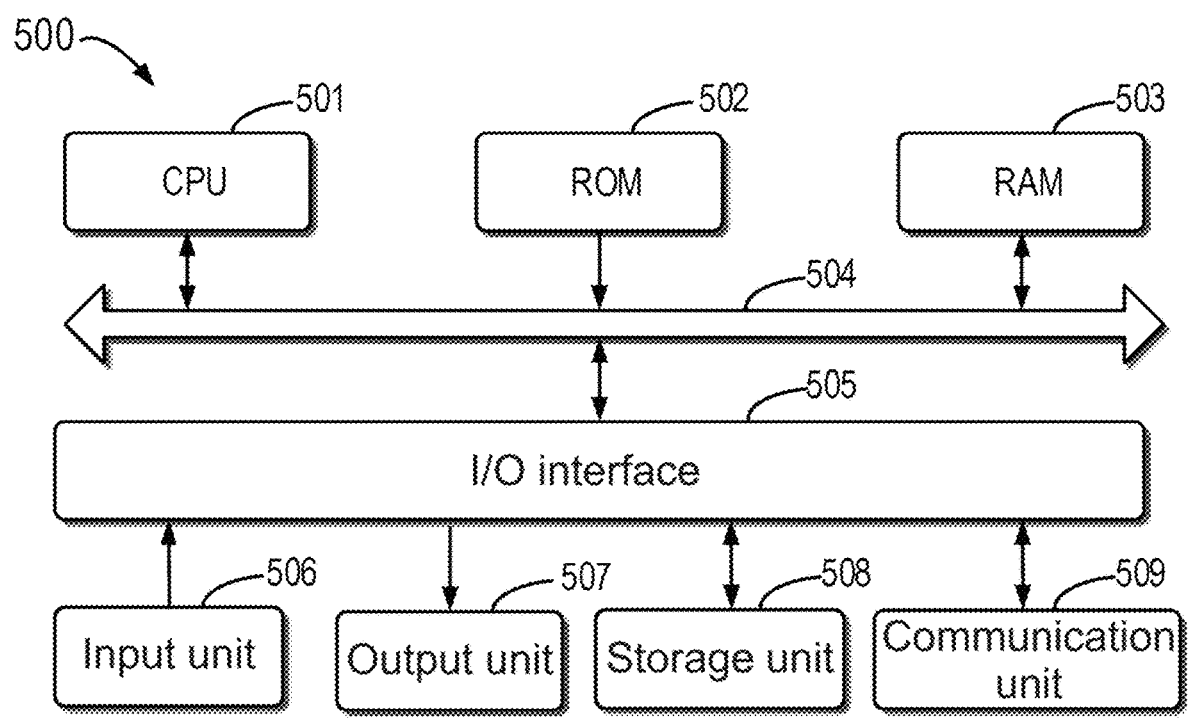
FIG. 5 shows a block diagram of a device that may be used to implement an embodiment of the present disclosure.

FIG. 5 shows a block diagram of a device 500 that may be used to implement an embodiment of the present disclosure. The device 500 may be a device, an apparatus, or a system described in embodiments of the present disclosure. For example, the device 500 may be any hardware that carries at least a portion of the data store 110, model store 120 and feature store 130 of the storage device 100 of the present disclosure, such as a server and a device (e.g., a terminal device). As shown in FIG. 5, the device 500 includes a central processing unit (CPU) 501 which may perform various appropriate actions and processing according to computer program instructions stored in a read-only memory (ROM) 502 or computer program instructions loaded from a storage unit 508 to a random access memory (RAM) 503. Various programs and data required for operations of the device 500 may also be stored in the RAM 503. The CPU 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard and a mouse; an output unit 507, such as various types of displays and speakers; a storage unit 508, such as a magnetic disk and an optical disc; and a communication unit 509, such as a network card, a modem, and a wireless communication transceiver. The communication unit 509 allows the device 500 to exchange information/data with other devices via a computer network, such as the Internet, and/or various telecommunication networks.

The various methods or processes described above may be performed by the CPU 501. For example, in some embodiments, the method 200 may be implemented as a computer software program that is tangibly included in a machine-readable medium, such as the storage unit 508. As another example, in some embodiments, the model store 120 (or specifically, the method implemented by it) may be implemented as a computer software program that is tangibly contained in a machine-readable medium, such as the storage unit 508. In some embodiments, part of or all the computer program may be loaded and/or installed to the device 500 via the ROM 502 and/or the communication unit 509. When the computer program is loaded into the RAM 503 and executed by the CPU 501, one or more steps or actions of the method or process described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks (including a local area network (LAN) or a wide area network (WAN)) or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flow charts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flow charts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flow charts and/or block diagrams.

The flow charts and block diagrams in the accompanying drawings show the architectures, functions, and operations of possible implementations of the device, the method, and the computer program product according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method comprising:
encoding a search input into a first dense vector based on a first multi-modal search model of a model store of a storage system;
determining, based on the first dense vector, a distilled data item corresponding to the search input from a distilled dataset corresponding to the first multi-modal search model, wherein the distilled dataset is generated from an original dataset utilizing a data distillation model of the model store of the storage system, the first multi-modal search model of the model store of the storage system being constructed based on the distilled dataset, and wherein the first multi-modal search model has an accuracy that is less than that of a second multi-modal search model constructed based on the original dataset;
encoding, based on the first multi-modal search model, an original data item in an original data subset corresponding to the distilled data item in the original dataset corresponding to the distilled dataset into a second dense vector; and
determining, based on the second dense vector, an original data item from the original data subset as a search result corresponding to the search input.

2. The method according to claim 1, wherein before encoding the search input into the first dense vector, the method further comprises:
determining the distilled dataset by distilling the original dataset; and
constructing the first multi-modal search model based on the distilled dataset.

3. The method according to claim 1, wherein the distilled dataset reproduces the second multi-modal search model constructed based on the original dataset.

4. The method according to claim 2, wherein each distilled data item comprised in the distilled dataset is distilled image data or a distilled text file.

5. The method according to claim 1, wherein a class of the original dataset is saved as a folder in a data store, and a file in the folder is a training sample of the class.

6. The method according to claim 4, wherein constructing the first multi-modal search model comprises one of the following items:
using, in a case that the distilled data item is the distilled image data, a task description, a dataset description, a class name, and a folder path corresponding to the distilled image data as a text input, and using a distilled image corresponding to the distilled image data as an image input to train the first multi-modal search model; or
using, in a case that the distilled data item is the distilled text file, the distilled text file, as well as a task description, a dataset description, a class name, and a folder path corresponding to the distilled text file, as a text input to train the first multi-modal search model.

7. The method according to claim 1, wherein the distilled data item in the distilled dataset is used as an index to the original data item in the original dataset.

8. The method according to claim 2, wherein constructing the first multi-modal search model further comprises:
encoding distilled data items in the distilled dataset to obtain a plurality of dense vectors; and
storing the plurality of dense vectors as indexes to original data items in the original dataset.

9. The method according to claim 8, wherein determining the distilled data item comprises:
determining a target dense vector having the closest distance to the first dense vector from the plurality of dense vectors; and
determining a target distilled data item corresponding to the target dense vector from the distilled dataset as the distilled data item.

10. The method according to claim 9, wherein the distance is a Euclidean distance.

11. The method according to claim 9, wherein encoding the original data item into the second dense vector comprises:
determining the original data subset corresponding to the target distilled data item in the original dataset; and
encoding original data items in the original data subset into the second dense vector through the first multi-modal search model.

12. The method according to claim 11, wherein determining the original data item comprises:
determining a second dense vector having the closest distance to the first dense vector from the second dense vector; and
determining an original data item corresponding to the second dense vector having the closest distance from the original data subset.

13. An electronic device, comprising:
at least one processing unit; and
memory coupled to the at least one processing unit and storing instructions, wherein the instructions, when executed by the at least one processing unit, cause the electronic device to perform the following actions:
encoding a search input into a first dense vector based on a first multi-modal search model of a model store of a storage system;
determining, based on the first dense vector, a distilled data item corresponding to the search input from a distilled dataset corresponding to the first multi-modal search model, wherein the distilled dataset is generated from an original dataset utilizing a data distillation model of the model store of the storage system, the first multi-modal search model of the model store of the storage system being constructed based on the distilled dataset, and wherein the first multi-modal search model has an accuracy that is less than that of a second multi-modal search model constructed based on the original dataset;
encoding, based on the first multi-modal search model, an original data item in an original data subset corresponding to the distilled data item in the original dataset corresponding to the distilled dataset into a second dense vector; and
determining, based on the second dense vector, an original data item from the original data subset as a search result corresponding to the search input.

14. The electronic device according to claim 13, wherein before encoding the search input into the first dense vector, the instructions, when executed by the at least one processing unit, further perform the following actions:
determining the distilled dataset by distilling the original dataset; and
constructing the first multi-modal search model based on the distilled dataset.

15. The electronic device according to claim 13, wherein the distilled dataset reproduces the second multi-modal search model constructed based on the original dataset.

16. The electronic device according to claim 14, wherein each distilled data item comprised in the distilled dataset is distilled image data or a distilled text file.

17. The electronic device according to claim 16, wherein constructing the first multi-modal search model comprises one of the following items:
- using, in a case that the distilled data item is the distilled image data, a task description, a dataset description, a class name, and a folder path corresponding to the distilled image data as a text input, and using a distilled image corresponding to the distilled image data as an image input to train the first multi-modal search model; or
- using, in a case that the distilled data item is the distilled text file, the distilled text file, as well as a task description, a dataset description, a class name, and a folder path corresponding to the distilled text file, as a text input to train the first multi-modal search model.

18. The electronic device according to claim 13, wherein encoding the original data item into the second dense vector comprises:
- determining the original data subset corresponding to the distilled data item in the original dataset; and
- encoding original data items in the original data subset into the second dense vector through the first multi-modal search model.

19. The electronic device according to claim 18, wherein determining the original data item comprises:
- determining a second dense vector having the closest distance to the first dense vector from the second dense vector; and
- determining an original data item corresponding to the second dense vector having the closest distance from the original data subset.

20. A computer program product, the computer program product being tangibly stored on a non-transitory computer-readable medium and comprising computer-executable instructions, and the computer-executable instructions, when executed by a computer, causing the computer to perform the following operations:
- encoding a search input into a first dense vector based on a first multi-modal search model of a model store of a storage system;
- determining, based on the first dense vector, a distilled data item corresponding to the search input from a distilled dataset corresponding to the first multi-modal search model, wherein the distilled dataset is generated from an original dataset utilizing a data distillation model of the model store of the storage system, the first multi-modal search model of the model store of the storage system being constructed based on the distilled dataset, and wherein the first multi-modal search model has an accuracy that is less than that of a second multi-modal search model constructed based on the original dataset;
- encoding, based on the first multi-modal search model, an original data item in an original data subset corresponding to the distilled data item in the original dataset corresponding to the distilled dataset into a second dense vector; and
- determining, based on the second dense vector, an original data item from the original data subset as a search result corresponding to the search input.

\* \* \* \* \*